(12) United States Patent
Mehdipour

(10) Patent No.: US 12,246,993 B2
(45) Date of Patent: Mar. 11, 2025

(54) METHODS AND SYSTEMS FOR BIOMASS-DERIVED $CO_2$ SEQUESTRATION IN CONCRETES AND AGGREGATES

(71) Applicant: CarbonBuilt, El Segundo, CA (US)

(72) Inventor: Iman Mehdipour, Los Angeles, CA (US)

(73) Assignee: CarbonBuilt, El Segundo, CA (US)

( * ) Notice: Subject to any disclaimer, the term of this patent is extended or adjusted under 35 U.S.C. 154(b) by 3 days.

(21) Appl. No.: 18/172,087

(22) Filed: Feb. 21, 2023

(65) Prior Publication Data
US 2023/0265019 A1   Aug. 24, 2023

Related U.S. Application Data

(60) Provisional application No. 63/312,380, filed on Feb. 21, 2022.

(51) Int. Cl.
 *C04B 40/02* (2006.01)
 *C04B 14/28* (2006.01)
 (Continued)

(52) U.S. Cl.
 CPC .......... *C04B 40/0236* (2013.01); *C04B 14/28* (2013.01); *F23K 1/00* (2013.01);
 (Continued)

(58) Field of Classification Search
None
See application file for complete search history.

(56) References Cited

U.S. PATENT DOCUMENTS

| | | | |
|---|---|---|---|
| 2,117,348 A | 5/1938 | Muskat | |
| 2,802,719 A | 8/1957 | Avedikian | |

(Continued)

FOREIGN PATENT DOCUMENTS

| | | | |
|---|---|---|---|
| AU | 2005290082 B2 | | 3/2011 |
| CN | 111760436 A | * | 10/2020 |

(Continued)

OTHER PUBLICATIONS

English translation of Deng.*

(Continued)

*Primary Examiner* — Jason Lau
(74) *Attorney, Agent, or Firm* — SQUIRE PATTON BOGGS (US)

(57) ABSTRACT

Provided herein are integrated biomass combustion-carbonation gas conditioning systems to directly sequester carbon dioxide from biomass-derived $CO_2$-containing flue gas. The $CO_2$ is sequestered by mineral carbonation in concrete materials within a carbonation reactor. The mineral carbonation processes sequester $CO_2$ in concrete materials, aqueous slurries, or aggregates without any additional carbon enrichment process. Contacting a $CO_2$-containing gas stream from a biomass combustion apparatus with concrete, aggregate, or alkaline solutions, causes a carbonation reaction in which carbonation products such as calcium carbonate ($CaCO_3$) and alumina silica gel are formed. The carbonation reactions set forth herein are useful for strengthening concrete and concrete components. Certain processes herein condition the biomass-derived flue gas. The conditioning includes condensing the gas to remove acidic gas, and to remove particulates and water. The conditioning includes adjusting the temperature, relative humidity, and gas flow rate of the biomass-derived flue gas without any carbon capture step before entering the carbonation reactor. The permanent storage of $CO_2$ in concrete materials reduces carbon emissions from biomass combustion systems. The process does so, in certain embodiments, at low temperatures, ambient pressure, and even under dilute $CO_2$ concentrations in $CO_2$-containing flue gas streams. For example, the $CO_2$ concentration in a $CO_2$-containing flue gas stream from a biomass combustion system may be lower than 20

(Continued)

volume percent (vol %) and be used to produce low-carbon concrete materials.

13 Claims, 8 Drawing Sheets

(51) Int. Cl.
| | |
|---|---|
| *F23K 1/00* | (2006.01) |
| *B01D 47/00* | (2006.01) |
| *B01D 53/26* | (2006.01) |
| *C04B 111/00* | (2006.01) |
| *F23J 15/02* | (2006.01) |

(52) U.S. Cl.
CPC ............ *B01D 47/00* (2013.01); *B01D 53/265* (2013.01); *C04B 2111/00017* (2013.01); *F23J 15/02* (2013.01); *F23K 2201/20* (2013.01)

(56) References Cited

U.S. PATENT DOCUMENTS

| | | |
|---|---|---|
| 3,725,259 A | 4/1973 | De Pree |
| 3,920,800 A | 11/1975 | Harris |
| 4,093,690 A | 6/1978 | Murray |
| 4,318,996 A | 3/1982 | Magder |
| 4,379,870 A | 4/1983 | Matsumoto |
| 4,432,666 A | 2/1984 | Frey et al. |
| 4,452,635 A | 6/1984 | Noshi et al. |
| 4,828,620 A | 5/1989 | Mallow et al. |
| 5,043,017 A | 8/1991 | Passaretti |
| 5,362,460 A | 11/1994 | Laird et al. |
| 5,435,846 A | 7/1995 | Tatematsu et al. |
| 5,455,013 A | 10/1995 | Shibata et al. |
| 5,518,540 A | 5/1996 | Jones, Jr. |
| 5,744,078 A | 4/1998 | Soroushian et al. |
| 5,798,328 A | 8/1998 | Kottwitz et al. |
| 5,928,420 A | 7/1999 | Oates et al. |
| 6,228,161 B1 | 5/2001 | Drummond |
| 6,264,736 B1 | 7/2001 | Knopf et al. |
| 6,416,727 B1 | 7/2002 | Virtanen |
| 6,569,923 B1 | 5/2003 | Slagter |
| 6,908,507 B2 | 6/2005 | Lalande et al. |
| 6,989,142 B2 | 1/2006 | Liu et al. |
| 7,361,324 B2 | 4/2008 | Liu et al. |
| 7,413,014 B2 | 8/2008 | Chatterji et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,815,880 B2 | 10/2010 | Constantz et al. |
| 7,842,126 B1 | 11/2010 | Dilmore et al. |
| 7,879,305 B2 | 2/2011 | Reddy et al. |
| 7,887,618 B2 | 2/2011 | Constantz et al. |
| 7,887,694 B2 | 2/2011 | Constantz et al. |
| 7,896,953 B1 | 3/2011 | Goswami et al. |
| 7,914,758 B2 | 3/2011 | Murray |
| 7,919,064 B2 | 4/2011 | Kawatra et al. |
| 7,947,240 B2 | 5/2011 | Vandor |
| 8,012,445 B2 | 9/2011 | Maijala et al. |
| 8,021,477 B2 | 9/2011 | Brown et al. |
| 8,066,965 B2 | 11/2011 | Fradette et al. |
| 8,088,292 B2 | 1/2012 | Neumann et al. |
| 8,137,444 B2 | 3/2012 | Farsad et al. |
| 8,163,066 B2 | 4/2012 | Eisenberger |
| 8,182,757 B2 | 5/2012 | Maijala et al. |
| 8,226,917 B2 | 7/2012 | Fan et al. |
| 8,252,242 B2 | 8/2012 | Vandor |
| 8,262,777 B2 | 9/2012 | Neumann et al. |
| 8,333,944 B2 | 12/2012 | Constantz et al. |
| 8,383,072 B2 | 2/2013 | Smedley et al. |
| 8,404,909 B2 | 3/2013 | Jadhav |
| 8,431,100 B2 | 4/2013 | Constantz et al. |
| 8,491,858 B2 | 7/2013 | Seeker et al. |
| 8,501,125 B2 | 8/2013 | Vandor |
| 8,507,228 B2 | 8/2013 | Simpson et al. |
| 8,617,500 B2 | 12/2013 | Lafarge |
| 8,691,175 B2 | 4/2014 | Kendall et al. |
| 8,757,072 B2 | 6/2014 | Garcia et al. |
| 8,771,621 B2 | 7/2014 | Karbarz |
| 8,852,319 B2 | 10/2014 | Wijmans et al. |
| 8,864,876 B2 | 10/2014 | Neumann et al. |
| 8,894,747 B2 | 11/2014 | Eisenberger et al. |
| 9,061,237 B2 | 6/2015 | Eisenberger et al. |
| 9,061,940 B2 | 6/2015 | Chen et al. |
| 9,163,297 B2 | 10/2015 | Langley |
| 9,205,371 B2 | 12/2015 | Cooper et al. |
| 9,221,027 B2 | 12/2015 | Kuppler et al. |
| 9,227,153 B2 | 1/2016 | Eisenberger |
| 9,382,120 B2 | 7/2016 | Dakhil |
| 9,382,157 B2 | 7/2016 | Guzzetta et al. |
| 9,388,072 B1 | 7/2016 | Niven et al. |
| 9,433,886 B2 | 9/2016 | Smedley et al. |
| 9,440,189 B2 | 9/2016 | Mercier et al. |
| 9,463,580 B2 | 10/2016 | Forgeron et al. |
| 9,469,547 B2 | 10/2016 | Kniesburges |
| 9,475,000 B2 | 10/2016 | Benyahia |
| 9,492,945 B2 | 11/2016 | Niven et al. |
| 9,555,365 B2 | 1/2017 | Eisenberger et al. |
| 9,677,154 B2 | 6/2017 | Karbarz |
| 9,707,513 B2 | 7/2017 | Constantz et al. |
| 9,714,406 B2 | 7/2017 | Constantz et al. |
| 9,757,688 B2 | 9/2017 | Mukherji |
| 9,786,940 B2 | 10/2017 | Langley |
| 9,789,439 B2 | 10/2017 | Siller et al. |
| 9,790,131 B2 | 10/2017 | Lee et al. |
| 9,808,759 B2 | 11/2017 | Balfe et al. |
| 9,861,931 B2 | 1/2018 | Kuopanportti et al. |
| 9,902,652 B2 | 2/2018 | Devenney et al. |
| 9,993,799 B2 | 6/2018 | Constantz et al. |
| 10,010,829 B2 | 7/2018 | Wright et al. |
| 10,246,379 B2 | 4/2019 | Niven et al. |
| 10,322,371 B2 | 6/2019 | Constantz et al. |
| 10,351,478 B2 | 7/2019 | Quinn et al. |
| 10,390,496 B2 | 8/2019 | Carson |
| 10,392,305 B2 | 8/2019 | Wang et al. |
| 10,570,064 B2 | 2/2020 | Monkman et al. |
| 10,584,038 B2 | 3/2020 | Maurer et al. |
| 10,875,815 B2 | 12/2020 | Riman |
| 10,898,846 B1 | 1/2021 | Kolodji |
| 10,940,433 B2 | 3/2021 | Mendoza et al. |
| 10,968,142 B2 | 4/2021 | Sant et al. |
| 11,040,898 B2 | 6/2021 | Sant et al. |
| 11,339,094 B2 | 5/2022 | Sant et al. |
| 11,359,862 B1 | 6/2022 | Nyer |
| 11,384,029 B2 | 7/2022 | Sant et al. |
| 11,491,439 B2 | 11/2022 | Arkadakskiy et al. |
| 2001/0023655 A1 | 9/2001 | Knopf |
| 2002/0158018 A1 | 10/2002 | Abramowitz et al. |
| 2002/0168473 A1 | 11/2002 | Ottersbach |
| 2003/0213937 A1 | 11/2003 | Yaniv |
| 2004/0077787 A1 | 4/2004 | Karande |
| 2005/0180910 A1 | 8/2005 | Park et al. |
| 2005/0238563 A1* | 10/2005 | Eighmy .................. C01F 11/18 423/432 |
| 2005/0242032 A1 | 11/2005 | Sugito et al. |
| 2006/0099132 A1 | 5/2006 | Erdman |
| 2006/0247450 A1 | 11/2006 | Wu et al. |
| 2007/0186821 A1 | 8/2007 | Brown et al. |
| 2008/0004449 A1 | 1/2008 | Yong et al. |
| 2008/0156232 A1 | 7/2008 | Crudden |
| 2008/0245274 A1 | 10/2008 | Ramme |
| 2008/0245672 A1 | 10/2008 | Little et al. |
| 2009/0001020 A1 | 1/2009 | Constantz et al. |
| 2009/0013742 A1 | 1/2009 | Zhang et al. |
| 2009/0056707 A1 | 3/2009 | Foody et al. |
| 2009/0081096 A1 | 3/2009 | Pellegrin |
| 2009/0169452 A1 | 7/2009 | Constantz et al. |
| 2009/0214408 A1 | 8/2009 | Blake et al. |
| 2010/0083880 A1 | 4/2010 | Constantz et al. |
| 2010/0251632 A1 | 10/2010 | Chen |
| 2011/0006700 A1 | 1/2011 | Chen et al. |
| 2011/0033239 A1 | 2/2011 | Constantz et al. |
| 2011/0174156 A1 | 7/2011 | Saunders et al. |
| 2011/0195017 A1 | 8/2011 | Martinez Martinez et al. |

(56) References Cited

U.S. PATENT DOCUMENTS

| | | |
|---|---|---|
| 2011/0226010 A1 | 9/2011 | Baxter |
| 2011/0268633 A1 | 11/2011 | Zou |
| 2011/0290155 A1 | 12/2011 | Vlasopoulos |
| 2012/0082839 A1 | 4/2012 | Ha |
| 2012/0186492 A1 | 7/2012 | Gane et al. |
| 2013/0008355 A1 | 1/2013 | Stokes |
| 2013/0036945 A1 | 2/2013 | Constantz et al. |
| 2013/0058857 A1 | 3/2013 | Stern et al. |
| 2013/0315810 A1* | 11/2013 | Stallmann ............ B01D 53/62 423/239.1 |
| 2014/0097557 A1 | 4/2014 | Alhozaimy |
| 2014/0197563 A1 | 7/2014 | Niven |
| 2014/0356267 A1 | 12/2014 | Hunwick |
| 2015/0167550 A1 | 6/2015 | Vandervort et al. |
| 2015/0225295 A1 | 8/2015 | McCandlish et al. |
| 2015/0307400 A1 | 10/2015 | Devenney et al. |
| 2016/0082387 A1 | 3/2016 | Constantz et al. |
| 2016/0177344 A1* | 6/2016 | Subhas ................ B01D 53/62 435/297.1 |
| 2016/0280598 A1 | 9/2016 | Wang et al. |
| 2016/0362800 A1 | 12/2016 | Ren et al. |
| 2017/0182458 A1 | 6/2017 | Jiang et al. |
| 2017/0226021 A1 | 8/2017 | Sant et al. |
| 2017/0369329 A1 | 12/2017 | Paynter et al. |
| 2018/0238157 A1 | 8/2018 | Fu et al. |
| 2018/0341887 A1 | 11/2018 | Kislovskiy et al. |
| 2019/0047175 A1* | 2/2019 | Hargest ............... C04B 40/0236 |
| 2019/0177220 A1 | 6/2019 | Sant et al. |
| 2019/0232215 A1 | 8/2019 | Fujita et al. |
| 2019/0232216 A1 | 8/2019 | Constantz et al. |
| 2019/0367390 A1 | 12/2019 | Sant et al. |
| 2020/0062645 A1 | 2/2020 | Gong et al. |
| 2020/0129916 A1 | 4/2020 | Constantz et al. |
| 2020/0180964 A1 | 6/2020 | Sant et al. |
| 2020/0299203 A1 | 9/2020 | Sant et al. |
| 2020/0385280 A1 | 12/2020 | Dai et al. |
| 2021/0024364 A1 | 1/2021 | Sant et al. |
| 2021/0031154 A1 | 2/2021 | Nakamura et al. |
| 2021/0060484 A1 | 3/2021 | Aziz et al. |
| 2021/0069637 A1 | 3/2021 | Ghasemi et al. |
| 2021/0101107 A1 | 4/2021 | Heidel et al. |
| 2021/0107840 A1 | 4/2021 | Gong |
| 2021/0120750 A1 | 4/2021 | Bourhis et al. |
| 2021/0146300 A1 | 5/2021 | Mohamed et al. |
| 2021/0188671 A1 | 6/2021 | Sant et al. |
| 2021/0198157 A1 | 7/2021 | Sant et al. |
| 2021/0262320 A1 | 8/2021 | Nguyen et al. |
| 2021/0263320 A1 | 8/2021 | Seidman et al. |
| 2021/0354084 A1 | 11/2021 | Wang et al. |
| 2021/0387139 A1 | 12/2021 | Voskian et al. |
| 2022/0064066 A1 | 3/2022 | Sant et al. |
| 2022/0106194 A1 | 4/2022 | Pedroso et al. |
| 2022/0204401 A1 | 6/2022 | Sant et al. |
| 2022/0212935 A1 | 7/2022 | Sant et al. |
| 2022/0227677 A1 | 7/2022 | Mehdipour et al. |
| 2022/0288526 A1 | 9/2022 | Ahmed et al. |
| 2022/0331740 A1 | 10/2022 | Simonetti et al. |
| 2022/0362737 A1 | 11/2022 | Staufcik et al. |
| 2022/0380265 A1 | 12/2022 | Sant et al. |
| 2023/0058065 A1 | 2/2023 | Sant et al. |

FOREIGN PATENT DOCUMENTS

| | | | |
|---|---|---|---|
| EP | 2438977 B1 * | 8/2014 | ............ B01D 53/62 |
| EP | 3177384 A2 | 6/2017 | |
| EP | 3515879 A1 | 7/2019 | |
| EP | 3656750 A2 | 5/2020 | |
| EP | 3744700 A1 | 12/2020 | |
| JP | H05-294693 A | 11/1993 | |
| JP | H05-330878 A | 12/1993 | |
| JP | 2002-145650 A | 5/2002 | |
| JP | 6970469 B1 | 11/2021 | |
| WO | WO 2000/060141 A1 | 10/2000 | |
| WO | WO 2009/078430 A1 | 6/2009 | |
| WO | WO 2010/006242 A1 | 1/2010 | |
| WO | WO 2014/005227 A1 | 1/2014 | |
| WO | WO 2014/009802 A2 | 1/2014 | |
| WO | WO 2015/112655 A2 | 7/2015 | |
| WO | WO 2015/154174 A1 | 10/2015 | |
| WO | WO 2016/022522 A2 | 2/2016 | |
| WO | WO 2016/061251 A1 | 4/2016 | |
| WO | WO 2018/011567 A1 | 1/2018 | |
| WO | WO 2018/058139 A1 | 3/2018 | |
| WO | WO 2018/081308 A1 | 5/2018 | |
| WO | WO 2018/081310 A1 | 5/2018 | |
| WO | WO 2019/006352 A1 | 1/2019 | |
| WO | WO 2019/036386 A1 | 2/2019 | |
| WO | WO 2019/036676 A1 | 2/2019 | |
| WO | WO 2022/221665 A1 | 10/2022 | |
| WO | WO 2023/069370 A1 | 4/2023 | |

OTHER PUBLICATIONS

Glushkov et al., "Composition of gas produced from the direct combustion and pyrolysis of biomass" (Year: 2021).*
Abbasi et al., "An investigation of the effect of $RuO_2$ on the deactivation and corrosion mechanism of a $Ti/IrO_2+ Ta_2O_5$ coating in an OER application", journal of Electroanalytical Chemistry 777: 67-74 (2016).
Adenier et al., "Electrochemical Oxidation of Aliphatic Amines and Their Attachment to Carbon and Metal Surfaces," Langmuir, 20: 8243-8253 (2004).
Arshad et al., "Equilibrium Solubility of $CO_2$ in Alkanolamines," DTU Libraryy: 5 pages (2013).
Buck, "Alkali Reactivity of Strained Quartz as a Constituent of Concrete Aggregate," Aug. 1983, 17 pages.
Communication Pursuant to Rules 70(2) and 70a(2) EPC on EP 18845904.4 dated Apr. 28, 2021.
Dutcher et al., "Amine-Based $CO_2$ Capture Technology Development from the Beginning of 2013-A Review," ACS Applied Materials & Interfaces, 7: 2137-2148 (2015).
Eisaman et al., "$CO_2$ separation using bipolar membrane electrodialysis," Energy & Environmental Science, 4: 1319-1328 (2011).
Erans et al., "Direct air capture: process technology, technoeconomic and socio-political challenges," Energy & Environmental Science, 15: 1360-1405 (2022), DOI: 10.1039/d1ee03523a.
Examination Report on IN 201927016758 dated Dec. 14, 2020, 5 pages.
Extended European Search Report on EP Application 18845904.4 dated Apr. 7, 2021.
Extended European Search Report on EP Application No. 17865241.8 dated May 15, 2020, 6 pages.
Falzone et al., "New insights into the mechanisms of carbon dioxide mineralization by portlandite", AIChE Journal, 67(5), 2021, pp. 1-12, 12 pages; AIChE J. 2021;e17160. https://doi.org/10.1002/aic.17160.
Fujimura et al., "Oxygen evolution on manganese-molybdenum oxide anodes in seawater electrolysis", Materials Science and Engineering: A 267.2: 254-259 (1999).
Hashimoto et al., "Advanced materials for global carbon dioxide recycling", Materials Science and Engineering: A 304: 88-96 (2001).
Husebye et al., "Techno economic evaluation of amine based $CO_2$ capture: impact of $CO_2$ concentration and steam supply," Energy Procedia, 23: 381-390 (2012).
International Preliminary Report on Patentability for PCT/US2017/058359 dated May 9, 2019, 7 pages.
International Preliminary Report on Patentability issued in PCT/US2018/040373 dated Jan. 9, 2020, 5 pages.
International Preliminary Report on Patentability on PCT/US2018/046557 dated Feb. 27, 2020, 7 pages.
International Search Report and Written Opinion for Application No. PCT/US2022/025028 dated Jul. 13, 2022.
International Search Report and Written Opinion for International Application No. PCT/US2015/055564 dated Jan. 22, 2016, 13 pages.
International Search Report and Written Opinion issued in PCT Application No. PCT/US2018/040373 dated Sep. 20, 2018, 7 pages.

(56) References Cited

OTHER PUBLICATIONS

International Search Report and Written Opinion mailed Jun. 15, 2023, for International Application No. PCT/US2023/013350, 10 pages.

International Search Report and Written Opinion mailed Oct. 9, 2023, for International Application No. PCT/US2023/024217, 14 pages.

International Search Report and Written Opinion mailed Sep. 15, 2023, for International Application No. PCT/US2023/018395, 11 pages.

International Search Report and Written Opinion, issued in corresponding International Application No. PCT/US2018/046557 on Dec. 17, 2018, 12 pages.

International Search Report and Written Opinion, issued in International Application No. PCT/US2017/058359 dated Jan. 9, 2019, 8 pages.

Ivy, "Summary of Electrolytic Hydrogen Production Milestone Completion Report," National Renewable Energy Laboratory: 27 pages (2004).

Keith et al., "A Process for Capturing $CO_2$ from the Atmosphere," Joule, 2: 1573-1594 (2018).

Keith et al., "Climate Strategy with $CO_2$ Capture From The Air," Climatic Changes: 29 pages (2005).

La Plante et al., "Electrolytic seawater mineralization and how it ensures (net) carbon dioxide removal", Submitted to ACS ES&T Engineering, Jan. 2023, 23 pages.

La Plante et al., "Controls on $CO_2$ Mineralization Using Natural and Industrial Alkaline Solids under Ambient Conditions", ACS Sustainable Chem. Eng., 9(32), pp. 10727-10739, 2021.

Li et al., "pH control using polymer-supported phosponic acids as reusable buffer agents," Green Chem., 2015, vol. 17, pp. 3771-3774.

Liu et al., "Electrochemically mediated carbon dioxide separation with quinone chemistry in salt-concentrated aqueous media," Nature Communications, 11: Article No. 2278 pp. 1-11 (2020).

Lv et al., "Mechanisms of $CO_2$ Capture into Monoethanolamine Solution with Different CO2 Loading during the Absorption/Desorption Processes," Enviromental Science & Technology, 49: 10728-10735 (2015).

MacDowell et al., "An overview of $CO_2$ capture technologies," Energy & Environmental Science, 3: 1645-1669 (2010).

Marshall et al., "A review of adhesion science", Dental materials 26.2: e11-e16 (2010).

Mehdipour et al., "How Microstructure and Pore Moisture Affect Strength Gain in Portlandite-Enriched Composites That Mineralize $CO_2$", ACS Sustainable Chem. Eng., 7(15), pp. 13053-13061, 2019.

Mehdipour et al., "The role of gas flow distributions on $CO_2$ mineralization within monolithic cemented composites: coupled CFD-factorial design approach", Reaction Chemistry & Engineering 6 (3), pp. 494-504, 2021.

Mezza et al., "An Electrochemical Platform for the Carbon Dioxide Capture and Conversion to Syngas," Energies, 14: 7869 pp. 1-13 (2021).

Murnandari et al., "Effect of process parameters on the CaCO3 production in the single process for carbon capture and mineralization", Korean Journal of Chemical Engineering, Mar. 2017, vol. 34, Issue 3, pp. 935-941.

Final Office Action on U.S. Appl. No. 18/171,164 dated Sep. 29, 2023, 14 pages.

Final Office Action on U.S. Appl. No. 15/519,524 dated Nov. 21, 2019, 14 pages.

Final Office Action on U.S. Appl. No. 15/519,524 dated Oct. 14, 2020.

Non-Final Office Action on U.S. Appl. No. 18/171,164 dated Jun. 6, 2023, 16 pages.

Non-Final Office Action on U.S. Appl. No. 15/519,524 dated Apr. 29, 2020, 12 pages.

Non-Final Office Action on U.S. Appl. No. 15/519,524 dated May 16, 2019, 13 pages.

Non-Final Office Action on U.S. Appl. No. 16/431,300 dated Jan. 25, 2021.

Notice of Allowance on U.S. Appl. No. 15/519,524 dated Feb. 2, 2021.

Office Action on CN 201780076640.2 dated May 7, 2021.

Rahimi et al., "Bench-scale demonstration of $CO_2$ capture with an electrochemically driven proton concentration process," RSC Advances, 10: 16832 (2020).

Ramasubramanian et al., "Membrane processes for carbon capture from coal-fired power plant flue gas: A modeling and cost study," Journal of Membrane Science (2012) 421-422: 299-310.

Rau et al., "Direct electrolytic dissolution of silicate minerals for air CO2 mitigation and carbon-negative $H_2$ production," PNAS, 110(25): 10095-10100 (2013).

Reddy et al., "Simultaneous capture and mineralization of coal combustion flue gas carbon dioxide ($CO_2$), " Energy Procedia, 4, (2011), pp. 1574-1583.

Rinberg et al., "Alkalinity Concentration Swing for Direct Air Capture of Carbon Dioxide," ChemSusChem, 14: 1-16 (2021).

Roussanaly et al., "Techno-economic analysis of MEA $CO_2$ capture from a cement kiln—impact of steam supply scenario," Energy Procedia, 114: 6229-6239 (2017).

Sabatino et al., "Evaluation of a Direct Air Capture Process Combining Wet Scrubbing and Bipolar Membrane Electrodialysis," Industrial & Engineering Chemistry Research, 59: 7007-7020 (2020).

Sakwattanapong et al., "Behavior of Reboiler Heat Duty for $CO_2$ Capture Plants Using Regenerable Single and Blended Alkanolamines," Ind. Eng. Chem. Res., 44: 4465-4473 (2005).

Sanz-Pérez et al., "Direct Capture of $CO_2$ from Ambient Air", Chem. Rev., 2016, vol. 116, pp. 11840-11876, 37 pages.

Shu et al., "Electrochemical Regeneration of Spent Alkaline Absorbent from Direct Air Capture," Environmental Science & Technology, 54: 8990-8998 (2020).

Stern et al., "Bench-scale demonstration of $CO_2$ capture with electrochemically-mediated amine regeneration," RSC Advances, 4: 5906-5914 (2014).

Stern et al., "Post-combustion carbon dioxide capture using electrochemically mediated amine regeneration," Energy & Environmental Science, 6: 2505-2517 (2013).

Stripe Carbon Removal Purchase Application submitted Mar. 31, 2022.

Tang et al., "Advances in the application of manganese dioxide and its composites as electrocatalysts for the oxygen evolution reaction", Journal of Materials Chemistry A 8(36): 18492-18514 (2020).

Vance et al., "Direct Carbonation of $Ca(OH)_2$ Using Liquid and Supercritical $CO_2$: Implications for Carbon-Neutral Cementation", Ind. Eng. Chem. Res., 54(36), pp. 8908-8918, 2015.

Vega-Vila et al., "Metal cations as inorganic structure-directing agents during the synthesis of phillipsite and tobermorite", Reaction Chemistry and Engineering, Mar. 2023, vol. 8, pp. 1176-1184.

Voskian et al., "Faradaic electro-swing reactive adsorption for $CO_2$ capture," Energy & Environmental Science, 12: 3530-3547 (2019).

Wang et al. "Technoeconomic Analysis of the Electrochemically Mediated Amine Regeneration $CO_2$ Capture Process" Ind. Eng. Chem. Res., 59: 14085-14095 (Year: 2020).

Wang et al., "$CO_2$ Capture Using Electrochemically Mediated Amine Regeneration," Ind. Eng. Chem. Res. 2020, 59, 15, 7087-7096 27 pages (2020).

Wang et al., "Energetics of electrochemically mediated amine regeneration process for flue gas $CO_2$ capture," International Journal of Greenhouse Gas Control, 82: 48-58 (2019).

Wang et al., "Flue gas $CO_2$ capture via electrochemically mediated amine regeneration: System design and performance," Applied Energy, 255: 113879 (2019).

Wang et al., "Integration of $CO_2$ capture and storage based on pH-swing mineral carbonation using recyclable ammonium salts," Energy Procedia 4, 2011, 4930-4936.

Wei et al., "Clinkering-Free Cementation by Fly Ash Carbonation", Journal of $CO_2$ Utilization, 23, pp. 117-127, 2018.

\* cited by examiner

800: A process for sequestering carbon dioxide from a biomass combustion apparatus in carbonated concrete

↓

801: providing a $CO_2$-containing flue gas from a biomass combustion apparatus having a biomass discharge outlet

↓

802: conditioning the $CO_2$-containing flue gas to provide a conditioned gas by: removing particulate matter; and adjusting the temperature, flow rate, or a combination thereof, of the $CO_2$-containing flue gas

↓

803: wherein the conditioned gas has a different temperature, flow rate, or a combination thereof, than the $CO_2$-containing flue gas at the biomass discharge outlet; wherein the conditioned gas has the same concentration of $CO_2$ as the $CO_2$-containing flue gas at the biomass discharge outlet; wherein the concentration of $CO_2$ in the $CO_2$-containing flue gas is less than 20% by volume

↓

804: contacting, in a carbonation chamber, the conditioned gas with at least one block of concrete or concrete precursor until the at least one block of concrete or concrete precursor is carbonated 1.45 weight % to 2.2 weight % $CO_2$ by total solid mass

↓

805: making calcium carbonate in carbonated concrete that has a compressive strength of at least 1,600 pounds-per-square inch (PSI) at ambient pressure and temperatures ranging from, and including, 20 °C to 100°C

↓

806: wherein the process comprises recirculating the conditioned gas out of and back into the carbonation chamber; wherein the carbonation chamber is a flow-through reactor

FIG. 8

METHODS AND SYSTEMS FOR BIOMASS-DERIVED $CO_2$ SEQUESTRATION IN CONCRETES AND AGGREGATES

CROSS-REFERENCE TO RELATED APPLICATIONS

This applications claims priority to, and the benefit of, U.S. Provisional Patent Application No. 63/312,380, filed Feb. 21, 2022, and entitled METHODS AND SYSTEMS FOR BIOMASS-DERIVED $CO_2$ SEQUESTRATION IN CONCRETES AND AGGREGATES, the entire contents of which are herein incorporated by reference in its entirety for all purposes.

FIELD

The present disclosure concerns carbon dioxide ($CO_2$) mineralization and a system for sequestering direct biomass-derived $CO_2$ in concrete, concrete components, and also concrete aggregates at low temperatures and ambient pressure and without $CO_2$ enrichment. Direct biomass-derived $CO_2$ refers to $CO_2$ that originates from a biomass combustion apparatus but does not include additional $CO_2$ enrichment. Also set forth herein are methods of manufacturing carbonated concrete components. The methods include, but are not limited to, contacting a biomass-derived $CO_2$-containing conditioned flue gas inside of a carbonation chamber with green bodies or concrete components to precipitate calcium carbonate via mineral carbonation and permanently store $CO_2$ in concrete. The processes disclosed herein reduce $CO_2$ emissions from biomass combustion systems at low temperatures and ambient pressure and produce low-carbon concrete materials even under dilute concentrations of $CO_2$ in the $CO_2$-containing flue gas streams. Low-carbon means that the concrete materials were manufactured with a greater than 25% reduction in the greenhouse gas emissions required to make the concrete compared to conventional cement-based concrete materials. For example, the concentration of $CO_2$ in the $CO_2$-containing flue gas stream may, in some embodiments, be lower than 20 vol %.

BACKGROUND

Industrial $CO_2$ production is an environmental concern. For example, the manufacture of cement binder for concrete accounts for 5% of global $CO_2$ emissions from all industrial processes and fossil-fuel combustion in 2013. Greenhouse gases such as $CO_2$ absorb solar energy—the so-called Greenhouse Effect and result in climate change events. Rising levels of carbon dioxide in the atmosphere have been associated with global warming.

What is needed are carbon-negative technologies to convert biomass waste to energy while sequestering the biomass-derived $CO_2$-containing flue gas streams to make useful products and develop carbon removal pathways. Biomass fuels can be rich in alkali metals (K and Na) which are mainly present as simple salts and organic compounds and chlorine. These species are promptly released to the gas phase during combustion, forming HCl and KCl. High amounts of KCl, sulfur, and ash particulates in the combustion gases are frequently associated with enhanced deposit formation. This, in turn, can lead to corrosion and fouling of gas process equipment. Corrosion potential mitigation and removal of acidic gas from biomass-derived flue gas streams are needed to recover waste heat and utilize $CO_2$ from biomass-derived flue gas and convert it to products. Set forth herein are solutions to this and other problems in the field to which the instant disclosure relates.

SUMMARY

In one embodiment, set forth herein is a process for sequestering carbon dioxide from biomass combustion apparatus, comprising providing a $CO_2$-containing flue gas from a biomass combustion apparatus; conditioning the $CO_2$-containing flue gas to provide a conditioned gas; wherein the conditioning comprises: removing a compound selected from the group consisting of particulate matter, acidic gas, alkali chlorides, alkali sulfates, and combinations thereof; and adjusting the temperature, relative humidity, flow rate, or a combination thereof, of the $CO_2$-containing flue gas; wherein the conditioned gas has a different temperature, relative humidity, flow rate, or a combination thereof, than the $CO_2$-containing flue gas; and wherein the conditioned gas has the same concentration of $CO_2$ as the $CO_2$-containing flue gas without any carbon capture step; then contacting the conditioned gas in a carbonation chamber, with a component selected from the group consisting of a green body, concrete, an aqueous solution of alkaline solids, an aqueous solution of aggregates, or a combination thereof; and precipitating calcium carbonate at low temperatures and ambient pressures, even under dilute concentrations of $CO_2$ in the $CO_2$-containing flue gas streams from the biomass combustion system. For example, the concentration of $CO_2$ in the $CO_2$-containing flue gas stream may, in some embodiments, be lower than 20 vol %. In other embodiments, the concentration of $CO_2$ in the $CO_2$-containing flue gas stream may be lower than 18 vol %. In yet other embodiments, the concentration of $CO_2$ in the $CO_2$-containing flue gas stream may be lower than 15 vol %. The integrated biomass combustion-carbonation system allows for the permanent removal of $CO_2$ emissions from biomass combustion and for the sequestration of $CO_2$ in concrete materials via mineral carbonation. In certain embodiments, including any of the foregoing, the low temperatures range from, and include, 20° C. to 100° C.

In a second embodiment, set forth herein is a process for sequestering carbon dioxide, comprising providing a $CO_2$-containing flue gas from a biomass combustion apparatus; conditioning the $CO_2$-containing flue gas to provide a conditioned gas; wherein the conditioning comprises removing a compound selected from the group consisting of particulate matter, acidic gas, alkali chlorides, alkali sulfates, and combinations thereof; and adjusting temperature, relative humidity, flow rate, or a combination thereof, of the conditioned gas; and wherein the conditioned gas has approximately the same concentration of $CO_2$ as the $CO_2$-containing flue gas; contacting, in a carbonation chamber, the conditioned gas with a member selected from the group consisting of a green body, concrete, aggregate, alkaline solids, an aqueous solution of alkaline solids, an aqueous solution of aggregates, or a combination thereof; and precipitating calcium carbonate. The conditioned $CO_2$-containing flue gas that is derived from biomass combustion apparatus is utilized as-is at its dilute $CO_2$ concentration without any additional carbon capture or carbon enrichment step.

In a third embodiment, set forth herein is a gas processing system for integrating biomass combustion apparatus comprises: a biomass equipment apparatus integrated into a carbonation reactor; a gas processing apparatus comprising a heat exchanger and a condenser; wherein the gas processing apparatus is integrated into the biomass equipment apparatus and into the carbonation reactor; to condition flue gas.

In a fourth embodiment, set forth herein is a process for sequestering carbon dioxide from a biomass combustion apparatus at ambient temperature and pressure, comprising providing a $CO_2$-containing flue gas from a biomass combustion apparatus; conditioning the $CO_2$-containing flue gas to provide a conditioned gas; wherein the conditioning comprises: removing a member selected from the group consisting of particulate matter, acidic gas, alkali chlorides, alkali sulfates, and combinations thereof; and adjusting the temperature, relative humidity, flow rate, or a combination thereof, of the $CO_2$-containing flue gas; wherein the conditioned gas has a different temperature, relative humidity, flow rate, or a combination thereof, than the $CO_2$-containing flue gas; and wherein the conditioned gas has substantially the same concentration of $CO_2$ as the $CO_2$-containing flue gas without any carbon capture step; contacting, in a carbonation chamber, the conditioned gas with a component selected from the group consisting of a green body, concrete, an aqueous solution of alkaline solids, an aqueous solution of aggregates, or a combination thereof, and precipitating calcium carbonate.

In a fifth embodiment, set forth herein is a gas processing system for integrating a biomass combustion apparatus comprising: a biomass equipment apparatus coupled to a carbonation reactor; a gas processing apparatus comprising a heat exchanger and a condenser; wherein the gas processing apparatus is coupled to the biomass equipment apparatus and to the carbonation reactor; wherein the gas processing system is configured to condition biomass-derived $CO_2$-containing flue gas before entering it into the carbonation reactor.

In a sixth embodiment, set forth herein is an apparatus comprising: a biomass combustion apparatus coupled to a gas processing apparatus; wherein the gas processing apparatus is coupled to at least one or more carbonation chambers; where the gas process apparatus is configured to condition $CO_2$-containing flue gas from the biomass combustion apparatus to produce a conditioned gas; wherein the conditioned gas has a different temperature, relative humidity, flow rate, or a combination thereof, than the $CO_2$-containing flue gas; and wherein the conditioned gas has the same concentration of $CO_2$ as the $CO_2$-containing flue gas without any carbon capture step.

In a seventh embodiment, set forth herein is calcium carbonate made by a process set forth herein.

In an eighth embodiment, set forth herein is concrete made using calcium carbonate that is made by a process set forth herein.

BRIEF DESCRIPTIONS OF THE DRAWINGS

Figure 7:
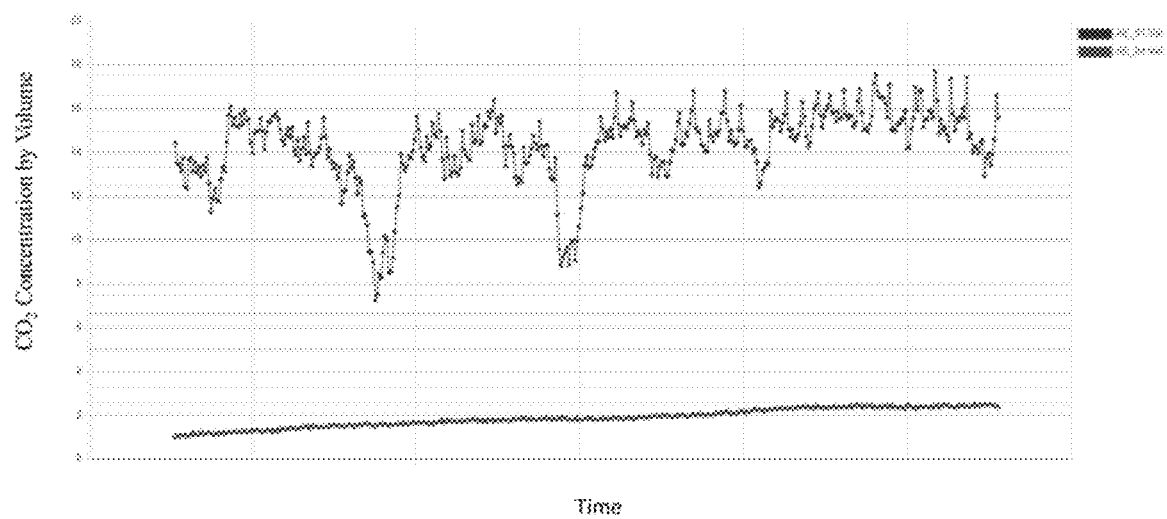

FIG. 7 shows a plot of $CO_2$ concentration (vol %) at a carbonation reactor chamber inlet and outlet points over 12 hours of carbonation curing of concrete blocks. AE01 (top plot) and AE04 (bottom plot) are $CO_2$ vol % measurements at the carbonation reactor chamber inlet and outlet points respectively. The difference between inlet and outlet $CO_2$% is related to $CO_2$ absorption via mineral carbonation in the concrete blocks in the carbonation reactor.

FIG. 8 is a block diagram showing an embodiment of a process herein.

DETAILED DESCRIPTION

Definitions

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is circular can refer to a diameter of the object. In the case of an object that is non-circular, a size of the non-circular object can refer to a diameter of a corresponding circular object, where the corresponding circular object exhibits or has a particular set of derivable or measurable characteristics that are substantially the same as those of the non-circular object. Alternatively, or in conjunction, a size of a non-circular object can refer to an average of various orthogonal dimensions of the object. Thus, for example, a size of an object that is an ellipse can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Herein, the phrase "the conditioned gas has substantially the same concentration of $CO_2$ as the $CO_2$-containing flue gas without any carbon capture step," means that the conditioned gas and the $CO_2$-containing flue gas have $CO_2$ concentrations (by volume) that are within 1% of each other.

Herein, the phrase "without any carbon capture step," means that the concentration of the $CO_2$ in the $CO_2$-containing flue gas at the biomass combustion apparatus discharge outlet is not enriched with, or increased by, for example, a $CO_2$ capture processes.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

As used herein, "biomass feedstock," includes any source of biologically-produced mass which may be burned to produce energy while sequestering the $CO_2$ to make products. Biomass includes, but is not limited to, wood chips, wood pellets, and sawdust.

As used herein, recycled concrete aggregate is a form of crushed concrete formulated into a paste. "Recycled concrete aggregates," may also refer to previously formed concrete milled/ground up.

As used herein, "carbonated materials" refers to materials made by contacting $CO_2$ to an alkaline-rich mineral material. Carbonate materials include, but are not limited to, calcium carbonate, calcite, vaterite, aragonite, or a combination thereof. Carbonated materials may include oxides, hydroxides, carbonates, silicates, sulfites, sulfates, chlorides, nitrates, or nitrites of calcium and/or magnesium and/or other uni-/multi-valent elements, or any combination thereof.

As used herein, the term "a carbonated concrete composite," refers to a carbonated concrete object (e.g., a building material) made from early-age (e.g., fresh) concrete that is then contacted with a $CO_2$-containing curing gas having a suitable $CO_2$ concentration.

As used herein, the term "other industrial alkaline solid wastes," or "other industrial solid wastes," refers to materials such as, but not limited to, alkaline-rich mineral materials.

Herein, a "residue" is a material that has been used, for example, in concrete production; or in a flue gas treatment, for example, as a sorbent or scrubbing material that are used for flue gas treatment or byproducts that are generated during industrial processes such as cement and lime manufacturing. A residue may include hydrated lime, lime kiln dust, cement kiln dust, fly ash, limestone, or combinations thereof. A residue may be referred to in the art as a mineral sorbent.

As used herein, "alkaline-rich mineral materials" refers to virgin, byproduct, or residue materials which include Ca and/or Mg. Alkaline-rich mineral materials include, but are not limited to, $Ca(OH)_2$, lime kiln dust, lime, hydrated lime, cement kiln dust, calcium-rich coal combustion residues, slag, off-spec fly ashes, biomass ashes, fluidized bed combustion ashes, circulating fluidized bed ashes, off-spec limes, mineral sorbent/scrubbing residues comprising anhydrous CaO and/or $Ca(OH)_2$, and combinations thereof. The alkaline-rich mineral materials may further comprise at least one of oxides, hydroxides, carbonates, silicates, sulfites, sulfates, chlorides, nitrates, or nitrites of calcium and/or magnesium, or any combination thereof.

As used herein, the "reaction medium" is the environment in the carbonation chamber.

As used herein, the "mineral carbonation reactor" is a reactor used to produce calcium carbonate by exposing, in a confined space, alkaline-rich mineral materials, aggregates, green body, concrete, or any combination thereof to a $CO_2$-containing gas stream.

As used herein, the term "active carbonation," refers to a process which results in a carbonation reaction rate that is above a natural value. For example, a carbonation rate at or above 0.005 per hour is a non-limiting example of active carbonation.

As used herein, the term "flow-through chamber," refers to a chamber through which gas may be flowed continuously and at ambient pressure.

As used herein, the term "ambient pressure," refers to atmospheric pressure on planet Earth.

As used herein, the term "a carbonated concrete composite," refers to a carbonated concrete object (e.g., a building material) made from early-age (e.g., fresh) concrete that is then contacted with a $CO_2$-containing curing gas having a suitable $CO_2$ concentration.

As used herein, the term "material performance of a carbonated concrete composite" is defined as porosity, compressibility, and/or other mechanical or strength measurement (e.g., Young's modulus, yield strength, ultimate strength, fracture point, etc.).

As used herein, the term "negatively affecting the material performance," refers to a material performance that is reduced in magnitude by a factor of 10 or more.

As used herein, the term "uniform material performance of a carbonated concrete component," refers to substantially uniform material properties throughout the concrete component. That is, there are no significant gradients or variations in material performance from one area of the concrete composite to another area of the concrete composite.

As used herein, the term "material performance gradient," refers to a spatial difference in porosity and/or compressibility in the carbonated concrete composite. In various embodiments, for uniform material performance, the porosity, measured as a volume percent, and/or the compressibility does not vary by more than +25% over a concrete volume unit of 1 $m^3$. In various embodiments, for uniform material performance, the porosity and/or compressibility does not vary by more than ±20% over a concrete volume unit of 1 $m^3$. In various embodiments, for uniform material performance, the porosity and/or compressibility does not vary by more than ±15% over a concrete volume unit of 1 $m^3$. In various embodiments, for uniform material performance, the porosity and/or compressibility does not vary by more than ±10% over a concrete volume unit of 1 $m^3$. In various embodiments, for uniform material performance, the porosity and/or compressibility does not vary by more than ±10% over a concrete volume unit of 10 $cm^3$. In various embodiments, for uniform material performance, the porosity and/or compressibility does not vary by more than ±5% over a concrete volume unit of 10 $cm^3$. In various embodiments, for uniform material performance, the porosity and/or compressibility does not vary by more than ±1% over a concrete volume unit of 10 $cm^3$. For example, the compressibility may be measured according to ASTM C140 under uniaxial monotonic displacement-controlled loading using a hydraulic jack with a capacity of 800 kN. In this example, the carbonated concrete composite does not have a material performance gradient if the compressibility does not vary by more than ±10%, preferably ±5% over a concrete volume unit of 10 $cm^3$.

As used herein, the term "gas conditioning apparatus," refers to a system which is configured to receive a $CO_2$-containing flue gas stream and adjust the temperature, relative humidity, flow rate, or a combination thereof, of the $CO_2$-containing flue gas stream before flowing the $CO_2$-containing flue gas stream out of the gas conditioning apparatus. A gas conditioning apparatus may also remove particulate matter, acidic gas alkali chlorides, alkali sulfates, and combinations thereof.

As used herein, the term "acidic gas" refers to gaseous sulfate or sulfate-including compounds, gaseous chlorine or chlorine-including compounds, and/or gaseous NOx (e.g., $NO_2$, $NO_3$, combinations thereof).

As used herein, the term "coupled to," refers to an electrical, digital, mechanical, wireless, Bluetooth, connection between one or more apparatus. Herein, "coupled to" and "integrated into" mean, unless specified otherwise to the contrary, that the objects coupled or integrated are mechanically connected to each other.

As used herein, the term "conditioned $CO_2$-containing flue gas stream," refers to a $CO_2$-containing flue gas stream wherein the incoming flue gas is first condensed to capture acidic gas and alkaline metals to minimize corrosion problems followed by adjusting temperature, relative humidity, flow rate, or a combination thereof, before introducing the gas into a carbonation reactor.

As used herein, the term "green body," refers to a concrete precursor.

As used herein, the term "rate of carbonation," refers to the rate which $CO_2$ is consumed. To quantify the carbonation kinetics, the time-$CO_2$ uptake profiles are fitted to an equation of the form $$C(t)=C(t_u)(1-\exp[(-k_{carb}t)/C(t_u)])  \quad (Eq. 6)$$

where $k_{carb}$ is the apparent carbonation rate constant and $C(t_u)$ is the ultimate $CO_2$ uptake at the end of carbonation curing duration.

For example, carbonation at or above 0.005 per hour means that $k_{carb}$ is a value 0.005 or greater. This would include but is not limited to, $k_{carb}$ of 0.05, or 0.5, or 1, or 2.

As used herein, the term "$CO_2$ conversion efficiency %" is defined as the average $CO_2$ uptake divided by the $CO_2$ input over the period of carbonation curing. The extent of carbonation conversion and carbonation rate refers to the weight of calcium carbonate formed from the starting material, e.g., OPC or LKD.

As used herein, the phrase "mainly calcium carbonates and alumina-silica gel," refers to a product mixture that is more than 50% by weight calcium carbonate. In some embodiments, the mixture is more than 90% by weight calcium carbonate. In some embodiments, including any of the foregoing, when two starting materials are used, such as LKD and fly ash, in which one starting material includes Al phases, Si phases, or both, then both calcium carbonate and alumina-silica carbonates may form during carbonation curing. In some other embodiments, when one starting material, such as portlandite, is used and which only includes $Ca(OH)_2$, then calcium carbonate may form but alumina-silica carbonates will not form during carbonation curing.

Systems

Figure 1:
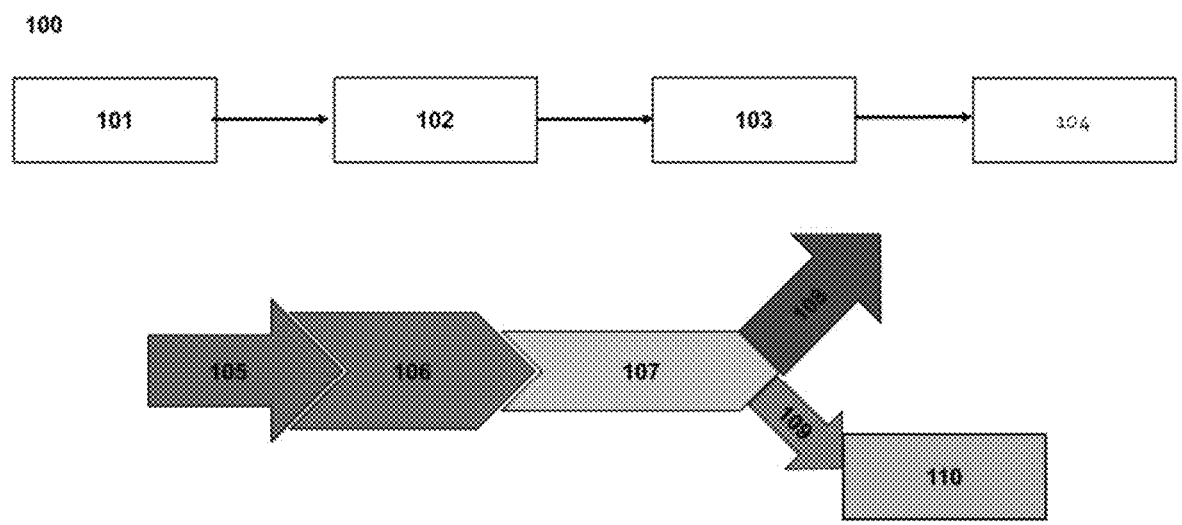
FIG. 1 shows a diagram illustrating the negative carbon emission pathway of biomass energy with carbon sequestration.

FIG. 1 shows a process, 100. The top process includes step 101 of biomass production. This is followed by step 102 which is biomass transportation. Next, step 103 includes biomass combustion. The last step is step 104, which includes carbon sequestration.

The bottom process in FIG. 1 includes step 105 of capturing atmospheric $CO_2$ in biomass. This is followed by step 106 which is providing biomass. Next, step 107 includes biomass combustion. After combustion, is step 108, which includes the conversion of biomass to energy, and step 109, which includes $CO_2$ release. After step 109, there is step 110 of a carbon sequestration process from biomass-derived flue gas.

Figure 2:
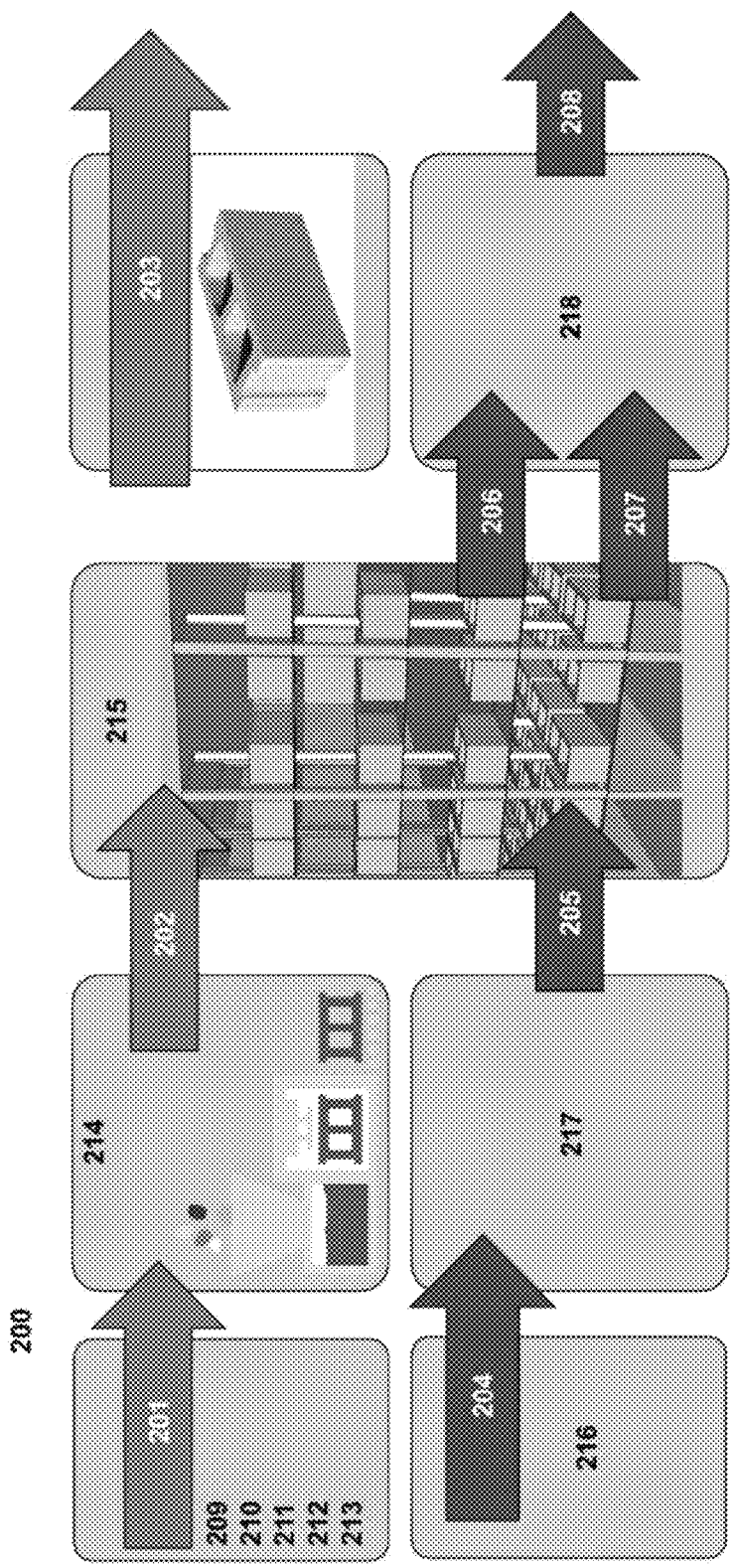
FIG. 2 shows a diagram illustrating the integration of biomass combustion equipment to sequester $CO_2$ in concrete, aqueous solution, and/or aggregate materials.

FIG. 2 shows an example process for integrating biomass-derived $CO_2$-containing flue gas streams into a carbonation sequestration system, 200. Panel 201 shows a list of possible raw materials. These raw materials, 209, 210, 211, 212, and 213, include, but are not limited to, hydrated lime, fly ash, cement, aggregates, water, and combinations thereof. The raw materials, 209-213, are processed using concrete production equipment, shown as 214. This processing of raw materials, 209-213, produces fresh concrete or fresh alkaline-rich aqueous slurry, 202, or both, in some instances. The fresh concrete or fresh alkaline-rich aqueous slurry is placed in a curing chamber, 215. Also shown is the production of a $CO_2$-containing flue gas, 204. The $CO_2$-containing flue gas, 204, is produced from biomass combustion equipment, 216. The biomass combustion equipment, 216, is further detailed herein and may include any system for burning biomass in a way that captures the combustion product gases without directly releasing these gases into the atmosphere. The biomass combustion equipment, 216, produces the $CO_2$-containing flue gas, 204. To condition such as removing acidic gas and adjusting temperature, relative humidity, and gas flow rate of $CO_2$ containing flue gas, 204, is processed using gas processing equipment, 217. The processing of the $CO_2$-containing flue gas, 204, in the gas processing equipment, 217, results in a conditioned gas stream, shown as 205. The conditioned gas stream, 205, contacts the fresh concrete, alkaline-rich aqueous slurry or aggregates, 202, in the curing chamber, 215. This results in carbonation reactions in the concrete, slurry, or aggregate. The carbonation reactions reduce the amount of $CO_2$ in the conditioned gas stream, 205, which results in $CO_2$-depleted gas, 206. Also produced is recycled water, 207. The $CO_2$-depleted gas, 206, and recycled water, 207, is transported through a gas recycling system, 218. Some of the gas in the gas recycling system, 218, is recycled back into the system with the $CO_2$-containing flue gas, 204. Some of the gas in the gas recycling system, 218, is exhausted into the atmosphere as shown in 208.

Figure 3:
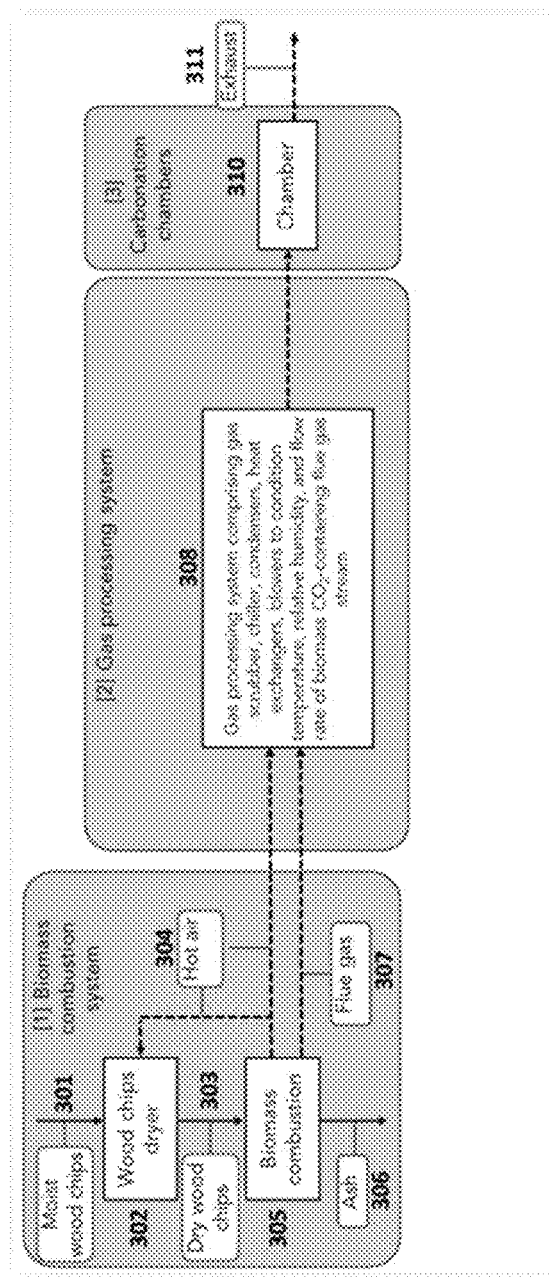
FIG. 3 shows a process flow diagram for using biomass-derived $CO_2$ sequestration in concrete, aqueous solution, and/or aggregate production.

FIG. 3 shows an example process flow diagram for Biomass Integration. FIG. 3 shows a [1] Biomass combustion system coupled to a [2] Gas processing system coupled to [3] Carbonation Chamber(s). The Biomass combustion system includes moist wood chips, 301. These moist wood chips, 301, are dried in the wood chip dryer, 302, to produce dry wood chips, 303. Hot air, 304, may circulate through the wood chip dryer, 302. The dry wood chips, 303, are loaded into a biomass combustion apparatus, 305, which produces hot air, 304, ash, 306, and flue gas, 307. FIG. 3 also shows a [2] gas processing apparatus, which includes a system that include a gas scrubber, chiller, condenser, heat exchangers, blowers to condition temperature, relative humidity, and flow rate of the biomass-derived $CO_2$-containing flue gas. FIG. 3 also shows [3] Carbonation Chambers. FIG. 3 shows curing chamber, 310, with exhaust outlet, 311. Other carbonation chambers are contemplated but not shown.

Embodiments

In some embodiments, set forth herein is a process for sequestering carbon dioxide, comprising providing a $CO_2$- containing flue gas from a biomass combustion apparatus; conditioning the $CO_2$-containing flue gas to provide a conditioned gas; wherein the conditioning comprises removing a compound selected from the group consisting of particulate matter, acidic gas, alkali chlorides, alkali sulfates, and combinations thereof; and wherein the conditioned gas has a different temperature, relative humidity, flow rate, or a combination thereof, than the $CO_2$-containing flue gas; and wherein the conditioned gas has substantially the same concentration of $CO_2$ as the $CO_2$-containing flue gas; contacting, in a carbonation chamber, the conditioned gas with a member selected from the group consisting of a green body, concrete, an aqueous solution of alkaline solids, aggregates, or a combination thereof; and precipitating calcium carbonate.

In some embodiments, set forth herein is a process for sequestering carbon dioxide from a biomass combustion apparatus, comprising providing a $CO_2$-containing flue gas from a biomass combustion apparatus having a biomass discharge outlet; conditioning the $CO_2$-containing flue gas to provide a conditioned gas; wherein the conditioning comprises: removing a member selected from the group consisting of particulate matter, acidic gas, alkali chlorides, alkali sulfates, and combinations thereof; and adjusting the temperature, relative humidity, flow rate, or a combination thereof, of the $CO_2$-containing flue gas; wherein the conditioned gas has a different temperature, relative humidity, flow rate, or a combination thereof, than the $CO_2$-containing flue gas at the biomass discharge outlet; and wherein the conditioned gas has the same concentration of $CO_2$ as the $CO_2$-containing flue gas at the biomass discharge outlet; contacting, in a carbonation chamber, the conditioned gas with a component selected from the group consisting of a green body, concrete, an aqueous solution of alkaline solids, an aqueous solution of aggregates, or a combination thereof, and precipitating calcium carbonate at ambient pressure and temperatures ranging from, and including, 20° C. to 100° C.

In some embodiments, including any of the foregoing, the process includes contacting, in a carbonation chamber, the conditioned gas with concrete.

In some embodiments, including any of the foregoing, the carbonation chamber is flow-through reactor.

In some embodiments, including any of the foregoing, the carbonation chamber is at ambient pressure.

In some embodiments, including any of the foregoing, the carbonation chamber is at a temperature from about 20° C. to about 100° C.

In some embodiments, including any of the foregoing, the carbonation chamber is at a temperature from about 20° C. to about 80° C.

In certain embodiments, the carbonation chamber is at 20° C. In certain embodiments, the carbonation chamber is at 25° C. In certain embodiments, the carbonation chamber is at 30° C. In certain embodiments, the carbonation chamber is at 35° C. In certain embodiments, the carbonation chamber is at 40° C. In certain embodiments, the carbonation chamber is at 45° C. In certain embodiments, the carbonation chamber is at 50° C. In certain embodiments, the carbonation chamber is at 55° C. In certain embodiments, the carbonation chamber is at 60° C. In certain embodiments, the carbonation chamber is at 65° C. In certain embodiments, the carbonation chamber is at 70° C. In certain embodiments, the carbonation chamber is at 75° C. In certain embodiments, the carbonation chamber is at 80° C.

In some embodiments, including any of the foregoing, the concentration of $CO_2$ in the $CO_2$-containing flue gas is about 5 to 20% by volume.

In some embodiments, including any of the foregoing, the concentration of $CO_2$ in the $CO_2$-containing flue gas is about 5 to 18% by volume.

In some embodiments, including any of the foregoing, the concentration of $CO_2$ in the $CO_2$-containing flue gas is about 5 to 15% by volume.

In certain embodiments, the concentration of $CO_2$ in the $CO_2$-containing flue gas is 5% by volume. In certain embodiments, the concentration of $CO_2$ in the $CO_2$-containing flue gas is 6% by volume. In certain embodiments, the concentration of $CO_2$ in the $CO_2$-containing flue gas is 7% by volume. In certain embodiments, the concentration of $CO_2$ in the $CO_2$-containing flue gas is 8% by volume. In certain embodiments, the concentration of $CO_2$ in the $CO_2$-containing flue gas is 9% by volume. In certain embodiments, the concentration of $CO_2$ in the $CO_2$-containing flue gas is 10% by volume. In certain embodiments, the concentration of $CO_2$ in the $CO_2$-containing flue gas is 11% by volume. In certain embodiments, the concentration of $CO_2$ in the $CO_2$-containing flue gas is 12% by volume. In certain embodiments, the concentration of $CO_2$ in the $CO_2$-containing flue gas is 13% by volume. In certain embodiments, the concentration of $CO_2$ in the $CO_2$-containing flue gas is 14% by volume. In certain embodiments, the concentration of $CO_2$ in the $CO_2$-containing flue gas is 15% by volume. In certain embodiments, the concentration of $CO_2$ in the $CO_2$-containing flue gas is 16% by volume. In certain embodiments, the concentration of $CO_2$ in the $CO_2$-containing flue gas is 17% by volume. In certain embodiments, the concentration of $CO_2$ in the $CO_2$-containing flue gas is 18% by volume. In certain embodiments, the concentration of $CO_2$ in the $CO_2$-containing flue gas is 19% by volume. In certain embodiments, the concentration of $CO_2$ in the $CO_2$-containing flue gas is 20% by volume.

In some embodiments, including any of the foregoing, the concentration of CO in the $CO_2$-containing flue gas is about 1 to 1000 ppm.

In some embodiments, including any of the foregoing, the process includes contacting, in a carbonation chamber, the conditioned gas with an aqueous solution of alkaline solids.

In some embodiments, including any of the foregoing, the process includes contacting, in a carbonation chamber, the conditioned gas with an aqueous solution of aggregates.

In some embodiments, including any of the foregoing, the concrete comprises hydrated lime, portland cement, coal combustion residues, recycled concrete aggregates, other industrial solid wastes, or a combination thereof.

In some embodiments, including any of the foregoing, the aqueous solution of alkaline solids comprises coal combustion residues, recycled concrete aggregates, slag, portland cement, hydrated lime, lime kiln dust, cement kiln dust, other industrial alkaline solid wastes, or a combination thereof.

In some embodiments, including any of the foregoing, the aggregates are selected from coal combustion residues, recycled concrete aggregates, slag, lime, lime kiln dust, natural alkaline rocks, other industrial alkaline solid wastes, or combinations thereof.

In some embodiments, including any of the foregoing, the $CO_2$-containing flue gas flows through exhaust discharge points of the biomass combustion apparatus.

In some embodiments, including any of the foregoing, the conditioning comprises passing the $CO_2$-containing flue gas through a gas conditioning apparatus to adjust at least one parameter selected from temperature, relative humidity, and gas flow rate.

In some embodiments, including any of the foregoing, the gas processing apparatus comprises:
- at least one gas cleaning system
- at least one condenser,
- at least one heat exchanger,
- at least one blower; and
- at least one air cooler or chiller. In some embodiments, the gas cleaning system is a gas scrubber.

In some embodiments, including any of the foregoing, the particulate matter comprises ash.

In some embodiments, including any of the foregoing, the acidic gas comprises sulfur oxide.

In some embodiments, including any of the foregoing, the acidic gas comprises $SO_x$ wherein x is 1 from 4.

In some embodiments, including any of the foregoing, the alkali chlorides are selected from KCl, NaCl, or a combination of KCl and NaCl.

In some embodiments, including any of the foregoing, the alkali sulfates are selected from $K_2SO_4$.

In some embodiments, including any of the foregoing, the process further includes: providing a biomass feedstock in the biomass combustion apparatus; and drying the feedstock if the feedstock has a moisture content greater than, or equal to, 30% by weight (w/w).

In some embodiments, including any of the foregoing, the process further includes: providing a biomass feedstock in the biomass combustion apparatus; and reducing acidic gas, alkaline content, particulate content, carbon monoxide (CO), volatile organic compounds (VOC), or a combination thereof, in the $CO_2$-containing flue gas by drying the feedstock.

In some embodiments, including any of the foregoing, the process does not further include a $CO_2$ enrichment step.

In some embodiments, including any of the foregoing, the process does not further include any $CO_2$ purification steps other than removing a compound selected from the group consisting of particulate matter, acidic gas, alkali chlorides, alkali sulfates, and combinations thereof.

In some embodiments, including any of the foregoing, the $CO_2$-containing flue gas from biomass combustion apparatus has a temperature ranging from about 75° C. to about 200° C.

In some embodiments, including any of the foregoing, the $CO_2$-containing flue gas from biomass combustion apparatus has a temperature ranging from about 20° C. to about 100° C.

In some embodiments, including any of the foregoing, the $CO_2$-containing flue gas from biomass combustion apparatus has a temperature ranging from about 20° C. to about 80° C.

In some embodiments, including any of the foregoing, the $CO_2$-containing flue gas from biomass combustion apparatus has a temperature ranging from about 50° C. to about 100° C.

In some embodiments, including any of the foregoing, the process includes cooling the $CO_2$-containing flue gas to condense acidic, alkaline, and particulate compounds followed by adjusting temperature, relative humidity, and flow rate before entering the carbonation chamber consisting of a green body, concrete, an aqueous solution of alkaline solids, an aqueous solution of aggregates, or a combination thereof.

In some embodiments, including any of the foregoing, the process includes providing a conditioned gas which increases the rate of carbonation in the carbonation chamber.

In some embodiments, including any of the foregoing, the conditioned gas has a temperature, relative humidity, $CO_2$ amount, gas stream flow rate, or a combination thereof to provide a carbonation rate constant of the precursor that is at or above 0.005.

In some embodiments, including any of the foregoing, the process includes recirculating the conditioned gas out of and back into the carbonation chamber.

In some embodiments, including any of the foregoing, the process includes removing water from the carbonation chamber.

In some embodiments, including any of the foregoing, the $CO_2$-containing flue gas flows, through a condenser, air cooler, heat exchanger, a heater, a blower, a chiller or a combination thereof in the gas processing apparatus.

In some embodiments, including any of the foregoing, the conditioned gas increases the rate of carbonation in the precursor.

In some embodiments, including any of the foregoing, the conditioned gas has a temperature ranging from about 20° C. to about 90° C.

In some embodiments, including any of the foregoing, the conditioned gas has a relative humidity ranging from about 10% to about 90%. In certain embodiments, the conditioned gas has a relative humidity of 10%. In certain embodiments, the conditioned gas has a relative humidity of 20%. In certain embodiments, the conditioned gas has a relative humidity of 30%. In certain embodiments, the conditioned gas has a relative humidity of 40%. In certain embodiments, the conditioned gas has a relative humidity of 50%. In certain embodiments, the conditioned gas has a relative humidity of 60%. In certain embodiments, the conditioned gas has a relative humidity of 70%. In certain embodiments, the conditioned gas has a relative humidity of 80%.

In some embodiments, including any of the foregoing, the conditioned gas has a flow rate of at least 100 standard cubic feet per minute (scfm). In certain embodiments, the conditioned gas has a flow rate of less than 25,000 (scfm).

In some embodiments, including any of the foregoing, the process includes atomizing water into the conditioned gas to humidify the gas and increase relative humidity.

In some embodiments, including any of the foregoing, the process includes flowing the $CO_2$-containing flue gas through a gas cleaning system such as cyclone, baghouse filter, wet scrubber, or electrostatic precipitator to reduce biomass ash and alkali chlorides present in exhaust gas before entering the gas processing system.

In some embodiments, including any of the foregoing, the calcium carbonate is vaterite, aragonite, calcite, or a combination thereof.

In some embodiments, including any of the foregoing, the process is a semi-dry process.

In some embodiments, including any of the foregoing, the process occurs in a flow-through reactor.

In some embodiments, including any of the foregoing, the process is an aqueous process.

In some embodiments, including any of the foregoing, the process is a slurry process.

In some embodiments, including any of the foregoing, the process occurs in a stirring reactor.

In some embodiments, including any of the foregoing, the process includes
adding an additive to the carbonation chamber.

In some embodiments, including any of the foregoing, the additive is added by injection.

In some embodiments, including any of the foregoing, the additive is added by spraying a solution of the additive into the carbonation chamber.

In some embodiments, including any of the foregoing, the process includes bubbling the conditioned gas through a solution comprising the additive.

In some embodiments, including any of the foregoing, the process occurs at 50° C. or less.

In some embodiments, including any of the foregoing, the additive is selected from the group consisting of $CaCl_2$, $CaSO_4$, $NH_4NO_3$, $NH_4Cl$, and combinations thereof.

In some embodiments, including any of the foregoing, the additive is selected from the group consisting of sodium hydroxide, potassium hydroxide, lithium hydroxide, calcium hydroxide, magnesium hydroxide, ammonium hydroxide, ammonium carbonate, ammonium chloride, calcium sulfate, calcium chloride, calcium nitrate, sodium carbonate, sodium bicarbonate, ammonia, trimethylamine, trimethylamine, monoethanolamine, diethanolamine, triethanolamine, isopropanolamine, diisopropanolamine, triisopropanolamine, alkali metal silicates, alkaline earth metal silicates, and combinations thereof.

In some embodiments, including any of the foregoing, the additive is selected from the group consisting of $CaCl_2$, $CaSO_4$, $NH_4NO_3$, $NH_4Cl$, and combinations thereof.

In some embodiments, including any of the foregoing, the additive is $CaCl_2$).

In some embodiments, including any of the foregoing, the additive is $CaSO_4$.

In some embodiments, including any of the foregoing, the additive is $NH_4NO_3$.

In some embodiments, including any of the foregoing, the additive is $NH_4Cl$.

In some embodiments, including any of the foregoing, the additive is selected from the group consisting of sodium hydroxide, potassium hydroxide, lithium hydroxide, calcium hydroxide, magnesium hydroxide, ammonium hydroxide, ammonium carbonate, ammonium chloride, calcium sulfate, calcium chloride, calcium nitrate, sodium carbonate, sodium bicarbonate, ammonia, trimethylamine, trimethylamine, monoethanolamine, diethanolamine, triethanolamine, isopropanolamine, diisopropanolamine, triisopropanolamine, alkali metal silicates, alkaline earth metal silicates, and combinations thereof.

In some embodiments, including any of the foregoing, the additive is sodium hydroxide. In some embodiments, including any of the foregoing, the additive is potassium hydroxide. In some embodiments, including any of the foregoing, the additive is lithium hydroxide. In some embodiments, including any of the foregoing, the additive is calcium hydroxide. In some embodiments, including any of the foregoing, the additive is magnesium hydroxide. In some embodiments, including any of the foregoing, the additive is ammonium hydroxide. In some embodiments, including any of the foregoing, the additive is ammonium carbonate. In some embodiments, including any of the foregoing, the additive is ammonium chloride. In some embodiments, including any of the foregoing, the additive is calcium sulfate. In some embodiments, including any of the foregoing, the additive is calcium chloride. In some embodiments, including any of the foregoing, the additive is calcium nitrate. In some embodiments, including any of the foregoing, the additive is sodium carbonate. In some embodiments, including any of the foregoing, the additive is sodium bicarbonate. In some embodiments, including any of the foregoing, the additive is ammonia. In some embodiments, including any of the foregoing, the additive is trimethylamine. In some embodiments, including any of the foregoing, the additive is trimethylamine. In some embodiments, including any of the foregoing, the additive is monoethanolamine. In some embodiments, including any of the foregoing, the additive is diethanolamine. In some embodiments, including any of the foregoing, the additive is triethanolamine. In some embodiments, including any of the foregoing, the additive is isopropanolamine. In some embodiments, including any of the foregoing, the additive is diisopropanolamine. In some embodiments, including any of the foregoing, the additive is triisopropanolamine. In some embodiments, including any of the foregoing, the additive is alkali metal silicates. In some embodiments, including any of the foregoing, the additive is alkaline earth metal silicates.

In some embodiments, set forth herein is a gas processing system for integrating biomass combustion apparatus comprises: a biomass equipment apparatus integrated into a carbonation reactor and a gas processing apparatus comprising a heat exchanger and a condenser; wherein the gas processing apparatus is integrated into the biomass equipment apparatus and into the carbonation reactor; to condition $CO_2$-containing flue gas.

In some embodiments, including any of the foregoing, the heat exchanger is selected from a gas-gas, water-gas heat exchangers, or a combination thereof.

In some embodiments, including any of the foregoing, the condenser is stainless steel or a corrosion-resistant alloy.

In some embodiments, including any of the foregoing, the gas processing system further includes a cyclone, baghouse filter, electrostatic precipitator, or a combination thereof.

In some embodiments, including any of the foregoing, the heat exchanger comprises an air-cooled or water-cooled chiller.

In yet other embodiments, the process occurs in a rotating or stirring carbonation reactor. In these embodiments, the process occurs in an aqueous/slurry. In the aqueous/slurry process, the $CO_2$-containing flue gas stream from biomass combustion apparatus flows through a slurry or aqueous solution of solid alkaline-rich mineral material which is being stirred or rotated.

FIG. 8 shows a process embodiment. FIG. 8 shows a process, 800, for sequestering carbon dioxide from a biomass combustion apparatus in carbonated concrete. FIG. 8 shows step 801 of providing a $CO_2$-containing flue gas from a biomass combustion apparatus having a biomass discharge outlet. FIG. 8 shows step 802 of conditioning the $CO_2$-containing flue gas to provide a conditioned gas by: removing particulate matter; and adjusting the temperature, flow rate, or a combination thereof, of the $CO_2$-containing flue gas. FIG. 8 shows step 803 wherein the conditioned gas has a different temperature, flow rate, or a combination thereof, than the $CO_2$-containing flue gas at the biomass discharge outlet; wherein the conditioned gas has the same concentration of $CO_2$ as the $CO_2$-containing flue gas at the biomass discharge outlet; and wherein the concentration of $CO_2$ in the $CO_2$-containing flue gas is less than 20% by volume. FIG. 8 shows step 804 of contacting, in a carbonation chamber, the conditioned gas with at least one block of concrete or concrete precursor until the at least one block of concrete or concrete precursor is carbonated 1.45 weight % to 2.2 weight % $CO_2$ by total solid mass. FIG. 8 shows step 805 of making calcium carbonate in carbonated concrete that has a compressive strength of at least 1,600 pounds-per-square inch (PSI) at ambient pressure and temperatures ranging from and, including, 20° C. to 100° C. FIG. 8 shows step 806 wherein the process comprises recirculating the conditioned gas out of and back into the carbonation chamber; wherein the carbonation chamber is a flow-through reactor.

EXAMPLES

All of the carbonated concrete masonry units produced during field testing (in Example 1) would be hollow concrete masonry units having nominal dimensions of 8×8×16 inches. (203×203×406 mm) and specified dimensions of 7.625×7.625×15.625 inches. (194×194×387 mm). Concrete units would be tested to verify compliance with ASTM C90-14, *Standard Specification for Loadbearing Concrete Masonry Units*. Compressive strength, absorption, density, and dimensional tolerances were determined in accordance with ASTM C140/C140M-15, *Standard Test Methods for Sampling and Testing Concrete Masonry Units and Related Units*. Linear drying shrinkage of the carbonated blocks would be evaluated in accordance with ASTM C426-16, *Standard Test Method for Linear Drying Shrinkage of Concrete Masonry Units*.

Example 1—Carbonation Curing Using Biomass $CO_2$—Prophetic Example

This Example shows how field testing would be performed on carbonated concrete components using integrated biomass combustion equipment at a pilot plant.

A pilot carbonation chamber would be fabricated and set up at a concrete block facility to formulate and produce concrete blocks and contact with biomass-derived $CO_2$ gas stream.

The performance of carbonated concrete blocks would be evaluated to verify their compliance with industry standards for use in construction applications. The density, water absorption, compressive strength, and $CO_2$ uptake of carbonated concrete blocks would be measured.

Example 2—Carbonation Curing as a Function of Moisture Content—Prophetic Example This Example shows the effect of the moisture content of biomass feedstock on gas processing energy demand and the performance of carbonated concrete.

Biomass resources at varying moisture contents would be provided. A dryer would be used to adjust the moisture content of biomass feedstock.

A pilot carbonation chamber would be fabricated and set up at a concrete block facility to formulate and produce concrete blocks and contact the same with biomass-derived $CO_2$ gas stream.

The performance of carbonated concrete blocks would be evaluated to verify their compliance with industry standards for use in construction applications. The density, water absorption, compressive strength, and $CO_2$ uptake of carbonated concrete blocks would be measured.

Example 3—Prophetic Example

This Example shows how to quantify the carbonate content of carbonated mineral materials.

Thermogravimetric analysis (TGA) would be used to assess the carbonation extent and $CO_2$ uptake of materials before and after the mechanochemical process. Around 50 mg of powder would be extracted from finished concrete products and heated from 35° C. to 975° C. at a rate of 15° C./min in aluminum oxide crucibles under ultra-high purity $N_2$ gas purge at a flow rate of 20 mL/min. The carbonate content would be quantified by assessing the mass loss associated with $CaCO_3$ decomposition over the temperature range of 550° C. to 950° C. It should be noted that the $CO_2$ uptake would account for the initial quantity of carbonates that are present in the mineral materials prior to the mechanochemical process.

Figure 4:
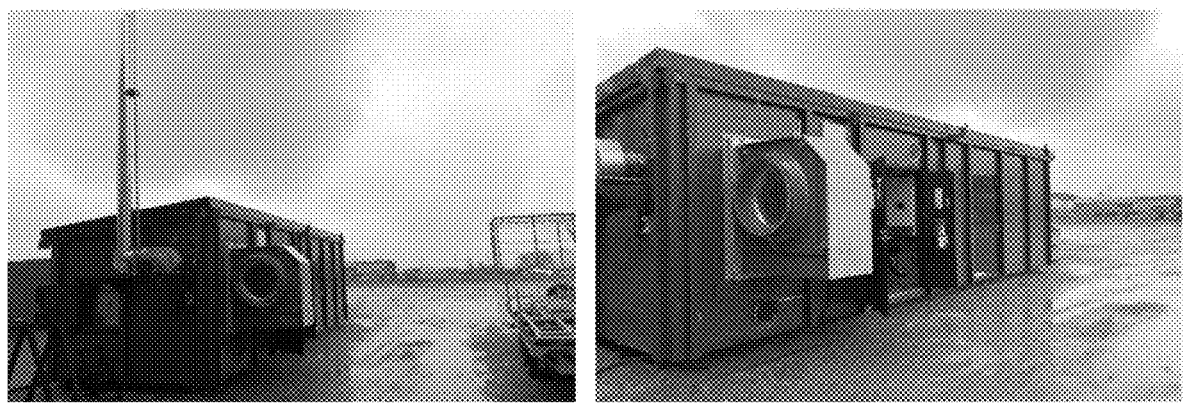
FIG. 4 shows a biomass combustion apparatus used at a concrete block manufacturing facility.
Figure 5:
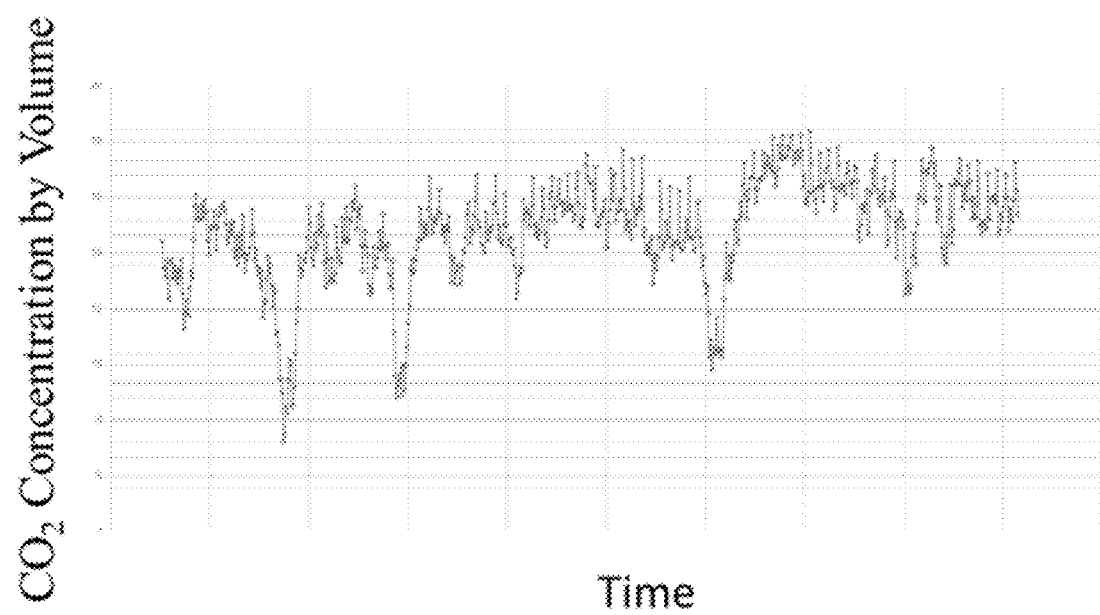
FIG. 5 shows a plot of $CO_2$ concentration (vol %) of flue gas at biomass combustion discharge outlet point over 12 hours.

Example 4—Conditioning Flue Gas Stream from Biomass Combustion System Using Gas Processing System for $CO_2$ Mineralization Process—Empirical Example This example shows the conditioning of $CO_2$-containing flue gas stream from a biomass combustion system. A 500-kW (1,700,000 btu/hr) biomass hot air combustion system was installed at a concrete block manufacturing facility (FIG. 4). The gas processing system was designed, fabricated, and integrated into a biomass combustion system to condition flue gas in terms of temperature, relative humidity, and flow rate before entering the carbonation curing chambers. The gas conditioning system included a scrubber to remove particulate matter, a condenser to cool flue gas to remove water to target relative humidity, a heat exchanger to heat up flue gas to the target temperature, and fans to adjust the flow of flue gas before going into the carbonation curing chambers. The block flow diagram of integrated biomass combustion-carbonation system is shown in FIG. 3. The biomass flue gas composition (volume fraction) from the discharge outlet, of the biomass combustion apparatus, was measured and is presented in Table 1. The trend of biomass flue gas $CO_2$ concentration (vol %) over the cycle of 12 hours at discharge outlet is shown in FIG. 5. The discharge outlet of the biomass combustion apparatus is the outlet directly attached to the biomass combustion apparatus. $CO_2$ emitted from the biomass combustion apparatus exits through the discharge outlet and then enters the gas conditioning apparatus, and then, after the gas conditioning apparatus, into the carbonation chamber.

TABLE 1

| Gas Composition as Discharge Outlet | | | |
|---|---|---|---|
| | Low | Medium | High |
| O2 | 5.82 | 5.00 | 4.000019 |
| CO2 | 11.59 | 13.01 | 13.84826 |
| SO2 | 0.00 | 0.00 | 0.001022 |
| NO2 | 0.01 | 0.01 | 0.014032 |
| H2O | 14.65 | 12.56 | 13.23506 |
| N2 | 67.93 | 69.42 | 68.9016 |
| CO | <500 ppm | <500 ppm | <500 ppm |
| | 100.00 | 100.00 | 100 |

Biomass waste wood chips were used as a fuel feedstock. The initial moisture content of woodchips was around 75 percent by weight (wt %). Woodchips were dried in a drier using hot air generated by a biomass combustion system to reduce the moisture content to around 30%. The dried wood chips were then fed into a biomass combustion system to generate $CO_2$-containing flue gas and superheated air.

Figure 6:
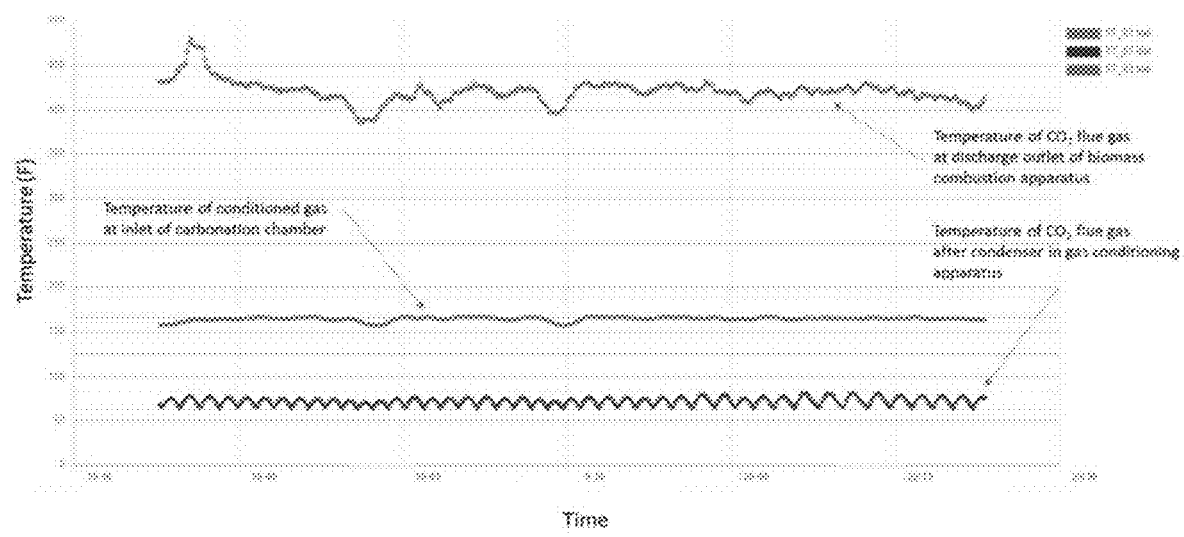
FIG. 6 shows a plot of temperature (° F.) of the biomass flue gas at the biomass combustion outlet (TT01), after cooling at condenser outlet (TT07), and after heating at heat exchanger outlet (TT03) over 12 hours.

Biomass $CO_2$-containing flue gas stream was initially passed through a scrubbing system to reduce particulate matter concentration from 350-400 mg/nm³ to about 35-70 mg/nm³. After the scrubbing process, the biomass $CO_2$-containing flue gas stream was passed through a condenser to cool and dehumidify the flue gas stream to adjust relative humidity content. The cooled flue gas stream was then passed through heat exchangers to heat up the flue gas to the target temperature before entering the carbonation curing chambers. If additional heat was needed, an electric duct heater was used to further boost the flue gas temperature. Biomass $CO_2$-containing flue gas stream was conditioned at T=30-80° C. (85-175° F.) and RH=20%-90% and flow rates between 100-3000 scfm before entering carbonation curing chambers comprising concrete blocks. FIG. 6 shows the representative plot of temperature conditioning of biomass flue gas through gas processing system comprising condenser and heat exchanger. In FIG. 6, the x-axis represents Time, and the y-axis represents temperature (in degrees Fahrenheit). Label TT_01. Val, on the top, is the temperature recorded for the $CO_2$-containing gas emitted at the biomass combustion apparatus discharge outlet. Label TT_07. Val, on the bottom, is the temperature recorded for the flue gas after the condenser in the gas conditioning apparatus. Label TT_03. Val, in the middle, is the temperature recorded for the conditioned gas containing $CO_2$ at the inlet to the carbonation chamber.

Example 5—Field Testing of Carbonated Concrete Blocks Using Direct Biomass Derived $CO_2$ Containing Flue Gas Stream at Block Manufacturing Facility—Empirical Example This pilot-testing example demonstrated the carbonation curing of concrete blocks produced via a $CO_2$-containing flue gas stream from a biomass combustion system at ambient pressure and low temperature ranging from 20° C. to 100° C. without any additional $CO_2$ enrichment process. The conditioned flue gas stream from the gas conditioning system was passed through a carbonation curing reactor and contacted with concrete blocks. Conditioned gas properties are as set forth in the preceding paragraph (paragraph [000131]).

Concrete blocks were produced and placed in a carbonation reactor and contacted with $CO_2$-containing flue gas stream from the biomass combustion system. All the carbonated concrete masonry units produced during field testing were hollow concrete masonry units having nominal dimensions of 8×8×16 inches. (203×203×406 mm) and specified dimensions of 7.625×7.625×15.625 inches (194× 194×387 mm).

Thermogravimetric analysis (TGA; STA 6000, Perkin Elmer) was used to assess the extent of carbonation experienced by the powder reactants. Around 40 mg of post-carbonation/hydration powder was heated from 35° C. to 975° C. at 15° C./min in an aluminum oxide crucible and under a 20 mL/min ultra-high purity $N_2$ purge. The $CO_2$ uptake of the concrete block was quantified by assessing the mass loss from the post-carbonation/hydration powder that is associated with $CaCO_3$ decomposition over the temperature range from 550° C. to 900° C., normalized by the mass of the initially dry powder placed in the TGA.

The concrete blocks featured a $CO_2$ uptake of around 1.45% to 2.2% by total solid mass and compressive strength ranging from 1600 pounds-per-square-inch (PSI) to 2100 PSI after twenty (20) hours of carbonation curing. The resulting strength gain is mainly attributed to combined carbonation-hydration reactions. The difference between $CO_2$ concentration trends at inlet and outlet of carbonation curing reactor comprising concrete blocks is shown in FIG. 7. The average $CO_2$ conversion efficiency over the period of the carbonation cycle ranged from 50% to about 85%. Label AE_01.val, on the top, represents the $CO_2$ concentration of the $CO_2$-containing flue gas emitted at the discharge outlet of the biomass combustion apparatus. Label AE_04.val, on the bottom, represents the $CO_2$ concentration of the $CO_2$-containing flue gas emitted at the discharge outlet of the carbonation chamber. The $CO_2$ concentration of the $CO_2$-containing flue gas does not change as it moves through the gas processing apparatus. However, the reduction in $CO_2$ concentration shown by the difference between the plot at label AE_01.val and the plot at AE_04.val is attributable to the $CO_2$ sequestered by carbonation reactions that occurred in the carbonation reactor.

For comparison, similar concrete blocks were cast and cured under air curing at a similar temperature and relative humidity without exposure to a $CO_2$-containing flue gas stream from biomass combustion system. The uncarbonated concrete blocks indicated a compressive strength ranging from 750 psi to 1000 psi after 20 hours of air curing.

This example highlights the effectiveness of $CO_2$ sequestration via mineral carbonation even under dilute $CO_2$-containing flue gas streams of lower than 15 vol % from biomass combustion systems to produce low-carbon concrete materials at low temperature and ambient pressure without any additional $CO_2$ enrichment/capture process. The integration of biomass combustion system into the $CO_2$ mineralization system enables permanent storage of $CO_2$ via mineral carbonation in concrete or construction material and thereby significantly reducing $CO_2$ emission and particulate matter in the biomass combustion systems.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure. It should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto.

What is claimed is:

1. A process for sequestering carbon dioxide from a biomass combustion apparatus in carbonated concrete, comprising
   providing a $CO_2$-containing flue gas from a biomass combustion apparatus having a biomass discharge outlet;
   conditioning the $CO_2$-containing flue gas to provide a conditioned gas by:
      removing particulate matter; and
      adjusting the temperature, flow rate, or a combination thereof, of the $CO_2$-containing flue gas;
   wherein the conditioned gas has a different temperature, flow rate, or a combination thereof, than the $CO_2$-containing flue gas at the biomass discharge outlet; and wherein the conditioned gas has the same concentration of $CO_2$ as the $CO_2$-containing flue gas at the biomass discharge outlet;

wherein the concentration of $CO_2$ in the $CO_2$-containing flue gas is less than 20% by volume;

contacting, in a carbonation chamber, the conditioned gas with at least one block of concrete or concrete precursor until the at least one block of concrete or concrete precursor is carbonated 1.45 weight % to 2.2 weight % $CO_2$ by total solid mass; and making calcium carbonate in carbonated concrete that has a compressive strength of at least 1,600 pounds-per-square inch (PSI) at ambient pressure and temperatures ranging from, and including, 20° C. to 100° C.;

wherein the process comprises recirculating the conditioned gas out of and back into the carbonation chamber;

wherein the carbonation chamber is a flow-through reactor.

2. The process of claim 1, wherein the conditioned gas is directly transferred to the carbonation chamber without using an additional $CO_2$ capture or enrichment process step.

3. The process of claim 1, wherein the average $CO_2$ conversion efficiency via mineral carbonation from biomass $CO_2$ emission ranges from about 30% to 95%.

4. The process of claim 1, wherein the concrete comprises hydrated lime, cement kiln dust, lime kiln dust, carbide lime, lime residues, portland cement, coal combustion residues, recycled concrete aggregates, natural pozzolans, other industrial solid wastes, a combination thereof, the carbonation products thereof, or the hydration products thereof.

5. The process of claim 1, wherein the at least one block further comprises aggregates selected from coal combustion residues, recycled concrete aggregates, slag, lime, lime kiln dust, natural alkaline rocks, other industrial alkaline solid wastes, or combinations thereof.

6. The process of claim 1, comprising conditioning the $CO_2$-containing flue gas in a gas processing apparatus that comprises:

at least one gas cleaning system,
at least one condenser,
at least one heat exchanger,
at least one blower; and
at least one air cooler or water chiller.

7. The process of claim 1, wherein heat from the biomass combustion apparatus is conducted to the $CO_2$-containing flue gas by hot air, hot water, steam, heat recovery from flue gas cooling, or a combination thereof.

8. The process of claim 1, further comprising:
providing a biomass feedstock in the biomass combustion apparatus; and
drying the feedstock if the feedstock has a moisture content greater than, or equal to, 30% by weight (w/w) to reduce carbon monoxide (CO), volatile organic compounds (VOC), or a combination thereof.

9. The process of claim 1, comprising providing a conditioned gas which increases the rate of carbonation in the carbonation chamber.

10. The process of claim 1, wherein the conditioned gas has a temperature, $CO_2$ amount, gas stream flow rate, or a combination thereof to provide a carbonation rate constant that is at or above 0.005.

11. The process of claim 1, comprising flowing the $CO_2$-containing flue gas through a gas cleaning system selected from a cyclone, baghouse filter, wet scrubber, or electrostatic precipitator, to reduce particulate matter present in the $CO_2$-containing flue gas.

12. The process of claim 1, further comprising making alumina-silica gel and calcium carbonate in carbonated concrete, further wherein at least 50% of the combination of alumina-silica gel and calcium carbonate is calcium carbonate.

13. The process of claim 1, wherein the conditioned gas that is recirculated out of and back into the carbonation chamber has the same or lower concentration of $CO_2$ as the $CO_2$-containing flue gas at the biomass discharge outlet.

* * * * *